Sept. 28, 1971  G. E. W. LEWIN  3,608,127
CASTER WHEEL ARRANGEMENT

Filed Nov. 20, 1967  3 Sheets-Sheet 1

United States Patent Office 3,608,127
Patented Sept. 28, 1971

3,608,127
CASTER WHEEL ARRANGEMENT
Gunnar Erik Werner Lewin, Viggbyholm, Sweden, assignor to AB Lyckeaborgs Bruk, Torskors, Sweden
Filed Nov. 20, 1967, Ser. No. 684,160
Claims priority, application Sweden, Dec. 2, 1966, 16,521/66; June 2, 1967, 7,736/67; June 30, 1967, 9,906/67
Int. Cl. B60b 33/00
U.S. Cl. 16—30
5 Claims

ABSTRACT OF THE DISCLOSURE

A caster wheel device which is rapidly mountable on and demountable from an object has a locking member secured to the object, a mounting plate engageable with the locking member and forming a part of the caster wheel device and a wheel fork element rotatably mounted in the mounting plate.

---

This invention relates to caster wheel arrangements without a central rivet and particularly to a caster wheel arrangement quickly and easily mounted and dismounted.

In the caster wheel arrangements which heretofore were commercially available, the stationary parts were rigidly attached to each other, for example by welding, so that the arrangement forms a unit which is secured to an object, for example a container, by welding or with screws.

The assembly proper of a caster wheel arrangement to a unit, inclusive of welding, rivetting or the like, heretofore was a relatively complicated operation. When thereafter the arrangement is to be mounted, for example on a container, additional welding work, screwing or rivetting is required, which in most cases must be carried out by skilled labour. If, for some reason, for example because of repair or exchange, the caster wheel arrangement must be removed, approximately as much work is required, in reverse order, as for mounting the arrangement.

Caster wheel arrangements at times wear out relatively rapidly, particularly when they are subjected to heavy loads, and must be exchanged or repaired after they have been in use for some time.

In consideration of all the work involved therein, it is rather expensive to exchange a caster wheel arrangement, especially as the exchange in many cases must be carried out by skilled labour. Moreover, a great number of complete caster wheel arrangements of different sizes must be kept in store.

The present invention has as its object to eliminate or substantially reduce the aforesaid problems and to produce a caster wheel arrangement which is easily and rapidly assembled and disassembled and which, besides, is easy to exchange in mounted state.

Accordingly, the present invention comprises a substantially square mounting plate and a wheel fork with a preferably cylindrical upper portion. The invention is characterized in that the mounting plate is provided with a relatively large central hole, and that the upper portion of the wheel fork has an outwardly bent bearing flange with an outer diameter exceeding the diameter of the central hole, said wheel fork being adapted to be inserted from above into the central hole of the mounting plate and to be supported via bearing members outside of the circumference of the cylindrical upper portion of the fork against the upper surface of the mounting plate close to the central hole, and that the mounting plate is adapted to be detachably mounted on an object with the help of a locking plate rigidly attached to said object.

The invention is described in a greater detail in the following, with reference to the accompanying drawings.

Figure 1:
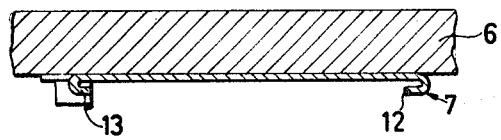
Figure 1:
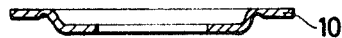
Figure 1:
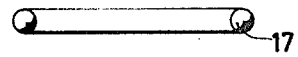
Figure 1:
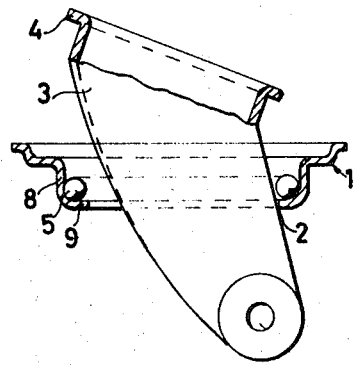
Figure 2:
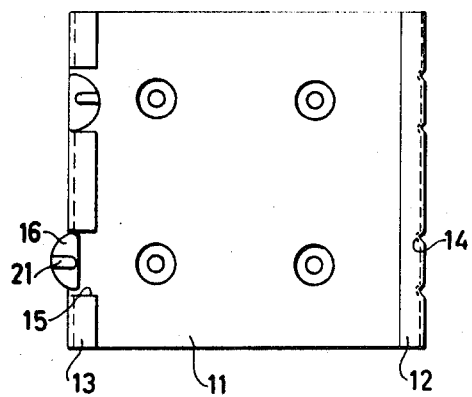
Figure 3:
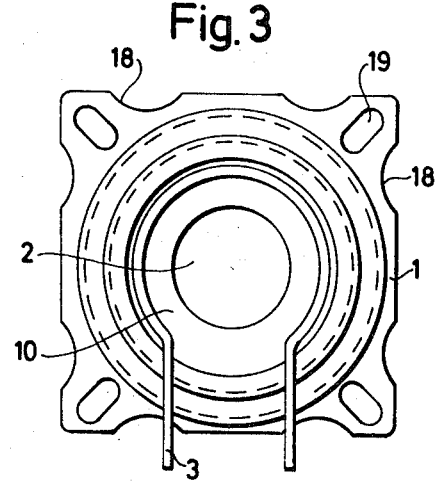
Figure 4:
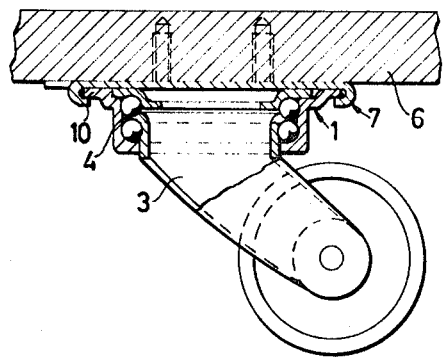
Figure 5:
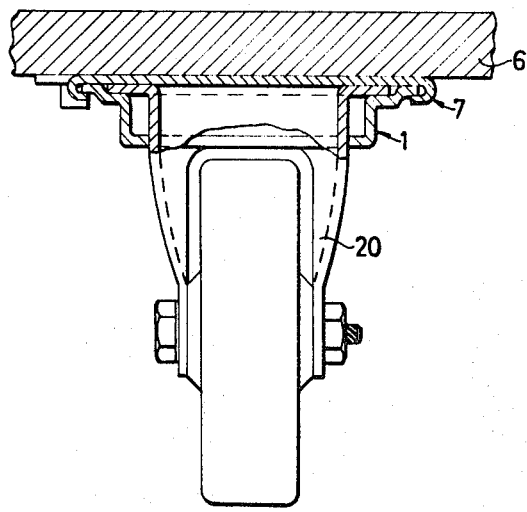

FIG. 1 shows an exploded view of a caster wheel arrangement according to the invention.
FIG. 2 shows in a horizontal view from below the locking plate.
FIG. 3 shows the mounting plate with mounted wheel fork as seen from below.
FIG. 4 shows a side view of a completely mounted caster wheel, partially in cross section.
FIG. 5 shows cross front view, partially in a section, of a non-revolving caster wheel arrangement.

The drawings show preferred embodiments of the caster wheel arrangement according to the invention. FIG. 1 shows in an exploded view a mounting plate 1 which is provided with a relatively large, preferably circular central hole 2 having a cylindrical wall 8. The lower edge of the wall is bent inwardly to form an angular bearing flange 9 adapted to support lower ball bearings 5. The wheel fork 3 is shown while being inserted in the central hole 2 of the mounting plate 1, and has an upper cylindrical portion with an upper edge bent outwardly to form a bearing flange 4. The outer diameter of the bearing flange 4 exceeds the diameter of the central hole 2 and, therefore, cannot pass through the central hole. The bearing flange 4 is provided with an upper and a lower ball race whereof the lower ball race is disposed so as to be supported on the lower ball bearings 5. The wall 8 of the upper cylindrical portion of the wheel fork abuts the lower ball bearing which, thus, is both an axial and a radial bearing. Thus the bearing of the wheel fork is given stability and the capacity of the wheel fork bearing to resist breaking forces is increased. The upper ball race of the wheel fork flange 4 carries upper ball bearings 17 against which abuts a ball race in a thrust plate 10 which is mounted in the mounting plate 1 in a manner to prevent torsion.

The mounting plate 1, and thereby the entire caster wheel arrangement, is adapted to be detachably retained on an object 6, for example a container, with the help of a locking plate 7 which in its turn is rigidly mounted at the said object.

The locking plate 7, as appears clearly from FIG. 2, preferably comprises a guide member 11 having two opposite edges 12 and 13 bent inwardly towards one another to form two guide channels. The bending of edge 12 is provided on the inside with inwardly extending projections 14 or the like, while the other edge 13 has recesses 15 in which members 16 are arranged urging the mounting plate 1 into the opposite channel formed by edge 12 of the guide member 11. The members 16 may be rotatable eccentric discs or the like.

As appears in FIG. 3, the mounting plate 1 is of a substantially square shape and along all of its four sides is provided with recesses 18 with which the projections 14 and the members 16 respectively engage for locking the mounting plate against displacement in all directions. Owing to the square shape of the mounting plate and the location of the recesses 18, the mounting plate can be mounted in four different positions. Thanks to this construction it is possible to compensate for a non-uniform wear of the ball races, for example due to lopsidedness or movement in one direction, simply by changing the position of the mounting plate in the locking plate.

The mounting plate is provided at its corners in known manner with longitudinal holes 19 which are directed to the centre and are intended to receive mounting screws, for use when no locking plate is provided.

FIG. 5 shows a non-revolving caster wheel with its wheel fork 20 mounted according to the invention, but without the bearing members.

The present caster wheel construction renders possible a highly desired displacement of the wheel fork bearing outside of the circumference of the upper cylindrical portion as shown in FIG. 4. Thus the breaking froces which, due to the form of the wheel fork, at times are very great, are distributed more uniformly on the bearing members and thereby reduce the tendency of point wear.

According to the invention, every part comprised in the caster wheel arrangement can be stored until it is needed at a certain place, Heretofore, storing involved great problems, because a great number of complete caster wheels of different sizes had to be kept in store at every place of application. Thanks to the system according to the invention even an unskilled person can exchange a damaged or worn part for a new one in a relatively short time without having to exchange the entire caster wheel arrangement. A suitable number of different wheel fork sizes are adapted to fit every mounting plate.

Caster wheel arrangements of a very large size as are intended for very heavy loads, for example, can be provided with double ball races.

The wheel fork, furthermore, may comprise two identical wheel fork halves which are held together at their upper portions by a ring with an outwardly bent upper flange, in which case the ring is shrunk upon the upper ends of the fork halves or attached to them in any suitable way.

What I claim is:

1. A rapidly mountable caster wheel device comprising a mounting plate having a central circular opening therein, a locking plate securely mounted on an object for detachably locking said mounting plate in place thereon, a rotatable wheel fork having an upper cylindrical portion disposed within the central opening of said mounting plate, said cylindrical portion of said wheel for having an outwardly extending flange about the upper edge thereof, said flange having a diameter greater than the diameter of the central opening in said mounting plate, and bearing means between said flange and the mounting plate adjacent the central opening whereby said wheel fork is rotatably mounted on said mounting plate.

2. A rapidly mountable caster wheel device as claimed in claim 1, wherein said mounting plate is provided with a cylindrical wall concentric with said central opening and an inwardly extending flange at the bottom of said wall to define said central opening and to receive said bearing means, said inwardly extending flange abutting the cylindrical portion of said wheel fork, whereby the wheel fork is supported both axially and radially.

3. A rapidly mountable caster wheel device as claimed in claim 2, and further comprising a non-rotatable thrust plate securely mounted to said mounting plate above and spaced from said outwardly extending flange, and a second bearing means disposed between said thrust plate and said outwardly extending flange.

4. A rapidly mountable wheel device as claimed in claim 3 wherein said bearing means are ball bearings.

5. A rapidly demountable caster wheel device comprising a mounting plate having a central circular opening therein, a locking plate securely mounted on an object for detachably locking said mounting plate in place thereon, a wheel fork having an upper cylindrical portion disposed within the central opening of the mounting plate said cylindrical portion having an outwardly extending flange about the upper edge thereof, said flange, having a diameter greater than the diameter of the central opening in said mounting plate so as to be supported by said mounting plate, said locking plate comprising a guide plate secured to the object, two guide channels on opposite sides of said guide plate for receiving said mounting plate, means within one channel for engaging the edge of said mounting plate when mounted in said guide plate, and movable means within the other channel for urging the mounting plate when mounted in said guide plate against the means within the opposite channel for engaging the edge of said mounting plate.

References Cited

UNITED STATES PATENTS

| | | | |
|---|---|---|---|
| 1,736,110 | 11/1929 | Beemer | 16—21 |
| 1,930,622 | 10/1933 | Noelting | 16—21 |
| 2,478,035 | 8/1949 | Babcock | 16—21 |
| 2,790,196 | 4/1957 | Rideout et al. | 16—30 |
| 2,800,679 | 7/1957 | Schultz, Jr. | 16—30X |

BOBBY R. GAY, Primary Examiner

D. L. TROUTMAN, Assistant Examiner